No. 790,121.  
Patented May 16, 1905.

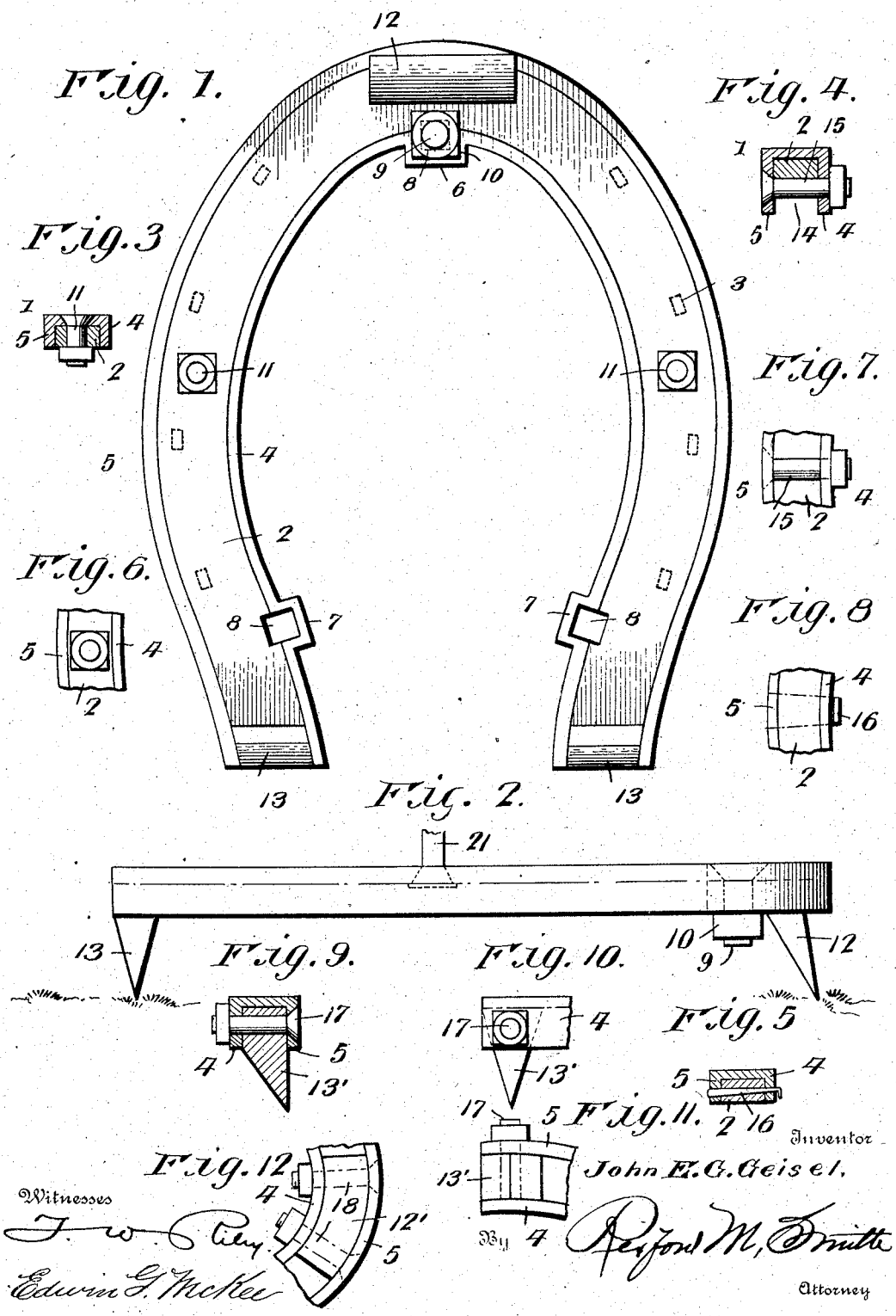

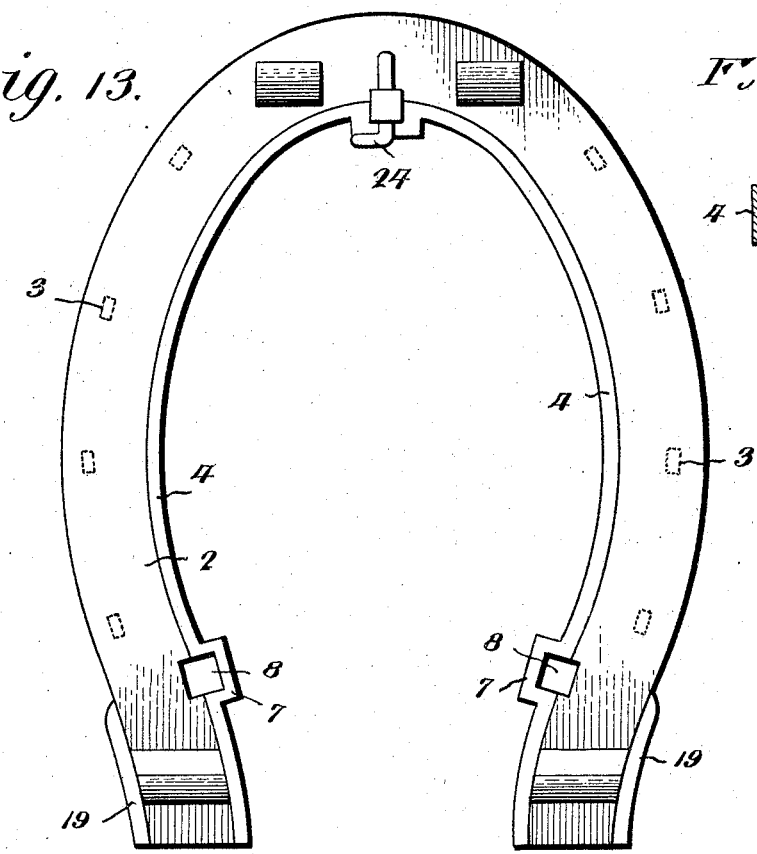
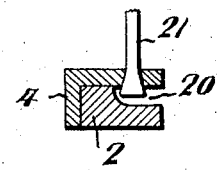
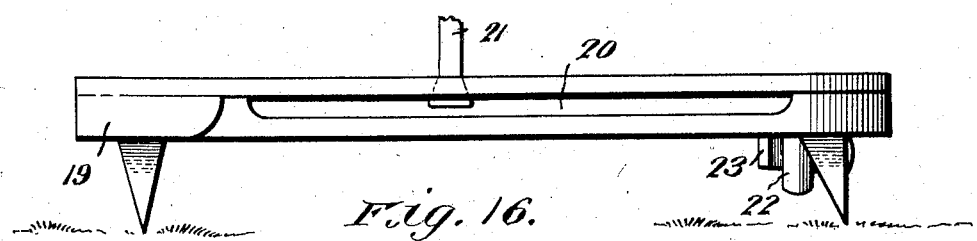
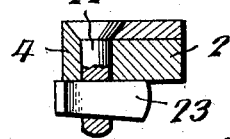

UNITED STATES PATENT OFFICE.

JOHN E. G. GEISEL, OF LEHIGHTON, PENNSYLVANIA.

HORSESHOE.

SPECIFICATION forming part of Letters Patent No. 790,121, dated May 16, 1905.

Application filed March 3, 1904. Serial No. 196,289.

*To all whom it may concern:*

Be it known that I, JOHN E. G. GEISEL, a citizen of the United States, residing at Lehighton, in the county of Carbon and State of Pennsylvania, have invented a certain new and useful Horseshoe, of which the following is a specification, reference being had therein to the accompanying drawings.

This invention relates to horseshoes, the primary object of the invention being to provide a two-part or sectional horseshoe one part or member of which is adapted to be secured to the hoof of an animal and the other part detachably connected to the first-named part or member, the detachable member being provided with heel and toe calks, thus enabling detachable members with sharp or blunt calks to be interchangeably connected with that part of the shoe which is permanently connected to the hoof. Instead of placing the calks on the detachable member or section of the shoe said calks may be secured directly to the permanently-attached member and made detachable and interchangeable with other calks.

The invention also has reference to the particular means for fastening the two parts or sections of the shoe together and also involves a novel relation between the two members or sections whereby the heads of the nails are provided for and also covered, protected, and concealed.

With the above and other objects in view, the nature of which will more fully appear as the description proceeds, the invention consists in the novel construction, combination, and arrangement of parts, as hereinafter fully illustrated, described, and claimed.

In the accompanying drawings, Figure 1 is a bottom plan view of a sectional horseshoe constructed in accordance with the present invention. Fig. 2 is a side elevation of the same. Figs. 3, 4, and 5 are detail cross-sections illustrating different ways of securing the sections of the shoe together. Figs. 6, 7, and 8 are bottom plan views, respectively, of the construction illustrated in Figs. 3, 4, and 5. Figs. 9, 10, and 11 are respectively cross-sectional, side elevation, and plan views illustrative of the manner of securing the heel-calks in place. Fig. 12 is a plan view showing one manner of securing the toe-calk in place. Fig. 13 is a bottom plan view of a simplified form of sectional horseshoe. Fig. 14 is a side or edge elevation of the same. Fig. 15 is a detail cross-section through the shoe shown in Fig. 13, and Fig. 16 is a detail cross-section through one of the fastening devices used in the simplified form of shoe.

Like reference-numerals designate corresponding parts in all the figures of the drawings.

Referring to the drawings, and particularly to Figs. 1 to 12, inclusive, which show the preferred embodiment of this invention, it will be seen that the shoe comprises two members, 1 designating the flanged base and 2 representing the removable section. The flanged base or main section, which is designed to be secured by means of nails or other fasteners directly to the hoof, is provided for that purpose with holes 3, through which the nails are driven into the hoof in the usual manner. The said base member is also provided with inner and outer flanges 4 and 5, extending, respectively, along the inner and outer edges thereof and being practically continuous from end to end, as clearly shown in Fig. 1. At the inner edge of the shoe and at points adjacent to the toe and heel thereof the shoe is provided with inwardly-extending offsets 6 and 7, and the inner flange 4 is correspondingly offset, as shown, to form a margin or guard surrounding the said offset portions. Formed partially in each offset and also in the body portion of the flanged base is a square opening 8, which is adapted to receive the square shank of a bolt 9, the bolt passing vertically through the shoe-sections and being provided with a threaded extremity upon which is placed a nut 10, which upon being screwed down tight bears against both sections of the shoe, and thereby holds said sections firmly together, the detachable section 2 being in this form of the same depth or thickness as the flanges 4 and 5, so that the lower surface of the section 2 lies flush with the edges of the flanges 4 and 5, as shown in Fig. 3. In addition to the bolts or auxiliary fasteners 9 other bolts, 11, may be passed vertically through the two members of the shoe at suitable points, preferably about midway of the sides of the shoe.

Under the preferred embodiment of this invention toe and heel calks 12 and 13, respectively, are formed on or permanently connected with the detachable section 2, and a section 2, bearing either sharp or blunt calks for winter or summer use, may be interchangeably fitted to and connected with the base-flange 1, it being only necessary to remove the securing-nuts.

By reference to Fig. 4 it will be seen that the channel 14 between the flanges 4 and 5 may be made deep enough to allow securing-bolts 15 to be passed transversely through the flanges, so as to bear against the outer surface of the removable section 2 and hold the latter snugly in place. Instead of using bolts as fastening means the sections 1 and 2 of the shoe may be provided with registering openings to receive taper keys or wedges 16, which are driven therethrough and clenched, as shown in Fig. 5.

Instead of employing the detachable section 2 the heel and toe calks may be applied to and connected directly with the main section or flanged base 1, and in this particular reference is had to Figs. 9 to 12, inclusive, Figs. 9, 10, and 11 showing a heel-calk 13' fitting snugly between the flanges 4 and 5 and secured by means of bolts 17. The toe-calk 12' (shown in Fig. 12) is also fitted directly between the flanges 4 and 5 and secured in place by means of bolts 18. The calks 12' and 13' may be removed when worn and replaced by other calks, either sharp or blunt.

A simplified form of the invention is illustrated in Figs. 13 to 16, inclusive, in which it will be seen that the outer flange is not extended continuously around the outer edge of the shoe, only a small portion of such flange being left, as shown at 19, just sufficient to engage the heel extremities of the detachable member 2 of the shoe. The inner flange 4 is left continuous, while the detachable member 2 extends entirely around said flange and is cut away or rabbeted at both sides, as shown at 20, to allow space for the heads of the nails 21, as shown in Figs. 14 and 15, whereby said nails form no obstruction to the proper relative positioning of the two members of the shoe, and at the same time provision is made for covering, protecting, and concealing the nails. Instead of using the bolts 9, hereinabove described, slotted bolts 22 may be employed, the same being inserted through the openings 8, so as to receive wedges or taper keys 23, which upon being driven through the slots in the bolts are bent or clenched, as indicated at 24, to prevent their subsequent escape and loss.

From the foregoing description it will be seen that while the flanged base member is permanently attached to the hoof the remaining section may be readily detached therefrom, thus enabling detachable sections with calks of different characters to be interchangeably used in connection with the permanently-attached section. It will also be seen that calks of different characters may be interchangeably connected directly with the flanged base of the shoe without using the detachable shoe-sections 2. It will also be seen that by forming the openings 8 partially in the offsets 7 and partially in the main body portion of both sections of the shoe the bolts serve as keys for the two sections and securely lock the same against relative sliding movement, while the nuts or keys used in connection with such bolts hold the two sections of the shoe firmly in contact with and prevent them from moving apart. It will be further seen that the nails do not interfere with the proper association of the two members of the shoe, and at the same time the heads of the nails are covered, protected, and concealed.

The invention hereinabove described enables new calks to be quickly placed upon the shoe in an inexpensive manner and without the necessity of employing the services of a skilled mechanic.

If desired, a strip of leather or rubber or analogous material may be inserted between the sections 1 and 2 of the shoe to prevent rattling and to keep the nuts tight on the bolts. Instead of recessing the part 2 to receive the nail-heads the part 1 may be recessed for that purpose, and both sections of the shoe may be drawn tightly together, as shown in Fig. 16. Where the bolts 9 are employed, the supplemental bolts 11 may in some cases be dispensed with.

Having thus described the invention, what is claimed as new is—

1. A horseshoe comprising a base-section having pendent flanges at its inner and outer edges, a removable calk-bearing section fitted between said flanges, fasteners inserted through the flanges and engaging the removable section to hold the latter in place, and auxiliary fasteners passing vertically through both of the shoe-sections, substantially as described.

2. A horseshoe comprising a base provided with pendent flanges extending continuously around its inner and outer edges and having openings arranged at opposite points in the flanges, a calk-bearing section fitted between said flanges and provided with openings, and fastenings inserted through the openings in the calk-section and flanges, substantially as and for the purpose described.

3. A horseshoe comprising a base having pendent flanges extending continuously around its outer and inner edges to form a channel, a detachable section bearing calks and fitted in said channel and being of less depth than the channel, and fasteners passing through transversely opposite openings in the flanges so as to engage the removable section and fasten the same in place between the flanges of the base, substantially as described.

In testimony whereof I affix my signature in presence of two witnesses.

JOHN E. G. GEISEL.

Witnesses:
W. M. DOLL,
LEVI HORN.